United States Patent [19]

Yamada et al.

[11] Patent Number: 5,213,833
[45] Date of Patent: May 25, 1993

[54] PRESERVING AGENT AND METHOD FOR ITS PRODUCTION

[75] Inventors: Nobuo Yamada, Fujieda; Taku Wada, Yaizu; Yoshio Iwai, Fujieda; Takafumi Sano, Ihara; Mituo Kanaoka, Iruma; Misao Kashiwamata, Yokohama, all of Japan

[73] Assignees: Sankyo Company, Limited, Tokyo; Fuji Seito Company Limited, Shimizu, both of Japan

[21] Appl. No.: 361,831

[22] Filed: Jun. 2, 1989

Related U.S. Application Data

[63] Continuation of Ser. No. 196,330, May 20, 1988, abandoned.

[30] Foreign Application Priority Data

May 22, 1987 [JP] Japan .................. 62-125459

[51] Int. Cl.$^5$ .............................. A23L 3/34
[52] U.S. Cl. ................... 426/542; 426/597; 426/643
[58] Field of Search ............ 426/542, 541, 643, 545, 426/330.3, 597

[56] References Cited

U.S. PATENT DOCUMENTS

| | | | |
|---|---|---|---|
| 2,511,804 | 6/1950 | Hall | 426/545 |
| 4,235,936 | 11/1980 | Kahn | 426/330.3 |
| 4,439,456 | 3/1984 | Kammuri | 426/643 |
| 4,440,796 | 4/1984 | Lunder | 426/597 |
| 4,539,216 | 9/1985 | Tse | 426/597 |
| 4,613,672 | 9/1986 | Hara . | |
| 4,673,530 | 6/1987 | Hara . | |
| 4,741,915 | 5/1988 | Farr | 426/542 |
| 4,913,909 | 4/1990 | Hara et al. . | |
| 4,946,701 | 8/1990 | Tsai | 426/597 |
| 5,023,017 | 6/1991 | Todd | 426/542 |
| 5,069,925 | 12/1991 | Lee | 426/597 |

FOREIGN PATENT DOCUMENTS

| | | | |
|---|---|---|---|
| 56-144060 | 11/1981 | Japan | 426/541 |
| 57-194749 | 11/1982 | Japan | 426/545 |
| 143561 | 2/1983 | Japan . | |
| 232075 | 4/1984 | Japan . | |
| 23440 | 7/1984 | Japan . | |

Primary Examiner—Carolyn Paden
Attorney, Agent, or Firm—Frishauf, Holtz, Goodman & Woodward

[57] ABSTRACT

Foodstuffs, especially sea food, may be preserved by means of a preserving agent comprising an extract of tea leaves. In accordance with the invention, the extract is employed in admixture with a polyhydroxy compound and an organic acid. Alternatively, the extract may be extracted from the tea leaves using an acidic aqueous extracting solution comprising said polyhydroxy compound and said organic acid.

36 Claims, 2 Drawing Sheets

PRESERVING AGENT AND METHOD FOR ITS PRODUCTION

This application is a continuation of application Ser. No. 07/196,330, filed May 20, 1988 which is now abandoned.

BACKGROUND TO THE INVENTION

The present invention relates to a novel preserving agent for various food products, especially but not exclusively useful for the preservation of fish, and which is prepared by extraction from tea leaves. It also provides a method for preparing the preserving agent and food compositions, especially sea food compositions, containing this agent as a preservative.

Sea food products, such as fish, various types of processed fish, crustaceans and the like, are renown for having a limited shelf life and especially a limited period of optimum freshness. There are several reasons for this. Typical causes of inferior quality of fishery products include putrefaction and decomposition of fishery products as a result of the propagation of microorganisms and the oxidation of lipid components in the fishery products.

Many means, such as drying, salting, smoking, heating, freezing or refrigerating, controlled atmosphere storage, radiation sterilization, vacuum packaging, gas packaging, deoxidizing agent sealed packaging, and addition of biocides or preserving agents, have been proposed in order to inhibit the propagation of microorganisms. Many other methods, such as freezing, refrigerating, vacuum packaging, gas packaging, deoxidizing agent sealed packaging, and addition of antioxidants, have been proposed in order to prevent oxidation of lipid components. The oxidation of lipid components leads to alterations in flavor and taste; this is generally accompanied by other undesirable degenerative changes, such as changing color, decomposition of vitamins and degeneration of proteins, and so the prevention of lipid oxidation is very important in order to stabilize the quality of fishery products and to maintain their nutritive value. There are many means to prevent the oxidation of lipids, typified by the above examples, but the most easy and effective means is to use an antioxidant. To date, many types of antioxidant have been used, but it is impossible to escape the conclusion that the action of these known antioxidants has, in general, been insufficient because of poor effectiveness, low durability of effects, and adverse influences on color and flavor.

Tea leaves are known to include active components having some form of preservative activity as a result of their antioxidant properties, and so some attempts have been made to use tea leaf components as preservatives, although not specifically for sea foods. However, their use on a large scale has not so far been possible. To date, water, alcohol, aqueous alcohol, acetone, and aqueous acetone have been used in an attempt to extract tea leaves, however, every method of extraction previously tried has been found to give rise to a variety of problems. For example, the amount of active preservative matter extracted may be too low, the amount of energy required for concentration may be too uneconomical, removal of coloring matter by me difficult, and safety of the workforce may be put at risk by certain extracting solvents. Accordingly, commercial utilization of these prior processes has been restricted. When obtained by extraction with water, the extracts had reduced activity, because only a relatively small quantity of active ingredients were extracted and because the quantity of polysaccharides and proteins in the extracts was high. When obtained by extraction with organic solvents (such as alcohols, e.g. ethanol, aqueous alcohols, acetone or aqueous acetone), the concentration of active ingredients was high, however, large quantities of coloring matter and lipids were simultaneously extracted, and so a further removal step to eliminate these unwanted materials was necessary; this gave rise to many additional problems, such as the loss of recycled organic solvents and the danger of the solvents catching fire.

We have now found that an acidic aqueous medium containing polyhydroxy compounds is capable of extracting active components effectively without contamination by ineffective coloring matter, and have also found that the solution obtained after the extraction could itself be used as quality preserving agent (i.e. a preserving agent which not only preserves the food but also maintains the quality as though the food had only just been processed).

Moreover, we have also discovered that the combination of the acidic medium and the polyhydroxy compound together with a tea extract (however prepared) also provides a quality preserving agent, especially for sea foods.

BRIEF SUMMARY OF INVENTION

Thus, in one aspect the present invention provides a method of producing an extract of tea (which may be green tea or the more usual, in the West, cured or fermented tea) leaves, in which the extracting solution is an acidic medium containing at least one food grade polyhydroxy compound, at least one food grade organic acid and water.

In another aspect, the present invention provides a food preservative solution comprising an extract of tea leaves, at least one food grade polyhydroxy compound, at least one food grade organic acid and water.

If required, the resulting solutions may be neutralised with a food grade alkali.

Figure 1:
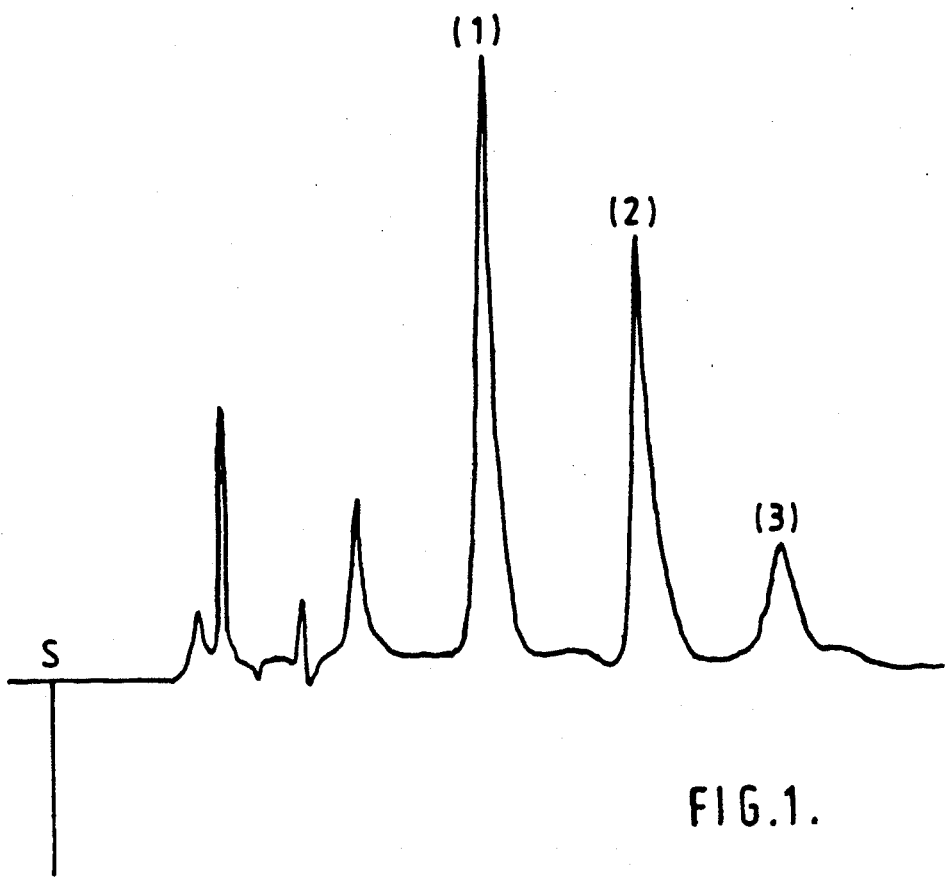
FIG. 1 shows a chart of the liquid chromatography of the extracts solution of Example 5.

DETAILED DESCRIPTION OF INVENTION (—)Epi-gallocatechin gallate and (—)epi-catechin gallate are representative of the important components of tea leaves which are believed to be extracted in the present invention (hereafter these components are called the "active components").

It will, of course, be understood that, since the extract of the present invention is intended to be used as a food preservative, which will be ingested, albeit in a relatively small quantity, by the public, it is necessary that all components of the extracting solution and of the preservative solution of the present invention should be food grade, as is well understood by those skilled in the art.

In a preferred embodiment of the present invention, the polyhydroxy compound used in both the extraction process of the present invention and the preservative solution of the present invention is: an alkane polyol, such as 1,2-propylene glycol or glycerol; a sugar alcohol, such as xylitol, sorbitol or maltitol; a sugar, such as xylose, glucose, fructose, sucrose, maltose or lactose; a food grade hydroxy polymer, such as polyvinyl alcohol; or a hydrolysate of starch or a hydrogenated analog thereof. If desired, a single one of these polyhydroxy compounds may be used, or it may be found preferable in particular situations to use a mixture of two or more of them. When the extracting solution itself is used as the preservative agent and in the case of the preservative agent, propylene glycol and glycerol are most preferably used as the polyhydroxy compound, glycerol being the more preferred of these. Monosaccharides, disaccharides and sugar alcohols would rank next in preference as the polyhydroxy compound. In general, the lower the molecular weight of the polyhydroxy compound used, the more effective the result. Compounds which are liquid at room temperature with a high boiling point, such as glycerol and propylene glycol are undesirable in dry food products, and thus large quantities of these should be avoided. This care has to be devoted similarly when the extracting solution is evaporated and used in the dry condition.

The organic acid used in the extracting and preservative solutions of the present invention likewise should be food grade and of a type suitable for inclusion in small amounts in a food product. Examples of suitable organic acids include such carboxylic acids as citric acid, tartaric acid, phytic acid, ascorbic acid and gallic acid. Where the acid itself has antioxidant properties, as do citric acid and ascorbic acid, this is a further benefit. Of these food grade organic acids, citric acid is most preferred. If desired, a single one of these organic acids may be used, or it may be found preferable in particular situations to use a mixture of two or more of them.

The active components of tea leaves are present in both green tea and cured or fermented tea and, accordingly, either type of tea leaves may be used with equal facility. Because green tea is the more readily available to us, the invention is hereafter illustrated primarily with reference to extraction of and extracts prepared from green tea. However, it will be understood that the description hereafter with reference to green tea applies *mutatis mutandis* to cured or fermented forms of tea. The tea referred to herein is, of course, that derived from the dried leaves of plants of the species *Thea sinensis* L, which is otherwise known by the names *Camellia sinensis, Camellia thea* Link and *Camellia theifera* (Griffith) Dyer.

When extracting tea leaves, the concentration of the polyhydroxy compound in the aqueous medium preferably ranges from about 50% to about 90% by weight. However, the most preferred concentration of polyhydroxy compound will vary, depending on the nature of the compound. In general, the quantity of active component extracted will increase in proportion to the concentration of the polyhydroxy compound or compounds, however, the viscosity of the extracting solution also increases with increasing concentration of polyhydroxy compound and processability decreases, and so the concentration of the polyhydroxy compound should be decided having regard to considerations of processability. In general, a concentration towards the upper end of the range suggested above is preferred, for example, a range from 70 to 90% by weight.

We have also investigated the effects of acidity or alkalinity of the aqueous medium on the extraction of tea leaves, and it was found that an acidic aqueous medium can extract the active components in a quantity three to four times more than a neutral aqueous medium, which is clearly an important factor in the extraction process of this invention. For example, when extracting tea leaves with an aqueous medium containing 85% by weight glycerol, the addition of about 1–2% by weight of citric acid as the organic acid to the aqueous medium improved the yield of active components from tea leaves to about 9.0%; this yield was 3.75 times that achieved when using an aqueous medium without any organic acid, in which case the yield of active components was only 2.4%. Moreover, when the added organic acid is neutralized, the extracting solution can be used as it is as a preservative agent.

In general, therefore, the quantity of organic acid added to the extracting solution will depend on the acidity of the acid. However, we normally prefer that the amount should be from 0.5 to 5% by weight of the extracting solution, more preferably from 1 to 4% by weight and most preferably from 1 to 3% by weight.

The quantity of the acidic aqueous medium containing the polyhydroxy compound (i.e. the extracting solution) for extraction of tea leaves is preferably from about 4 to about 10 times the weight of the tea leaves, more preferably from 4 to 7 times that weight. If the amount is under four times the weight of the tea leaves, the fluidity of the tea leaves/acidic medium mixture lessens, and both the efficiency of extraction and the processability decrease. If the amount is above ten times the weight of the tea leaves, the concentration of active component is reduced, and, if the extracting solution is to be used as it is as the preservative agent, its potency per unit is correspondingly reduced. When concentrating the solution, energy loss is large and its cost rises.

When the quantity of active components extracted per unit weight of tea leaves is compared when using different extracting solutions, we found the following: five times the volume of the tea leaves of an aqueous medium containing 1–2% by weight of citric acid and 85% by weight of glycerol was able to give a yield of active components of 7.5% by weight of the tea leaves used as the starting material; eight times the volume of the tea leaves of the same acidic aqueous medium gave a yield of 9.0%; five times the volume of the tea leaves of an aqueous medium containing 1–2% by weight of citric acid and 60% by weight of glycerol gave a yield of 6.0%; and five times the volume of the tea leaves of an aqueous medium containing 1–2% by weight of citric acid, 40% by weight of glycerol, 30% by weight of glucose, and the balance water gave a yield of 6.5%. Comparing the above examples with the prior art, five times the volume of the tea leaves of methanol can only give a yield of 3.9%, and five times the volume of the tea leaves of water also only gives the relatively low yield of 1.7%.

Moreover, when tea leaves are extracted with methanol, lipids, such as chlorophyll and others, are present in an amount of more than 10% by weight of the tea leaves, and so in order to use the extracts as a preservative agent, it is necessary to evaporate and remove the lipids. In order to remove such lipids, it is necessary to use about 40% to 50% by weight of active carbon based on the weight of the tea leaves. Moreover, a large quantity of energy is necessary to evaporate the methanol, and, furthermore, the extracted residue contains methanol in a proportion about the same as it was present in the original tea leaves, and this retained methanol can be recovered only with great difficulty, and consequently high costs can result from these problems. In comparison with extraction by methanol, the method of this invention uses an aqueous medium containing a polyhydroxy compound or compounds, and consequently lipids are normally not extracted or are extracted in only limited quantities. Accordingly, it is unnecessary to remove the lipids, and, when an edible polyhydroxy compound is used, the extracting solution can be used as it is as a preservative agent for food products, and energy for concentration is unnecessary, and other advantages can be expected.

There is no criticality as to the temperature at which extraction takes place, and, in principle, any extraction temperature may be used. Obviously, for convenience, we prefer to use an extraction temperature not too far from ambient, but a temperature above ambient will tend to allow the extraction to proceed faster, although ambient temperature could be used, if required. We have generally found best results in terms of ease of operation and speed of extraction when the extraction temperature is in the range of from ambient to 80° C. More preferably, the extraction temperature is in the range from 40° to 60° C., and this may easily be provided by commercially available heating means, such as hot water or steam jackets at about 65° to 70° C.

The time required for the extraction is likewise not critical: normally one will seek a balance between, on the one hand, the desire to extract as much as possible of the active components of the tea, and, on the other hand, a requirement to complete the extraction as quickly as possible. Also, too long an extraction time may, depending on the extraction temperature, lead to the extraction of a certain amount of unwanted matter. In general, depending on the extraction temperature, a period of from 5 to 15 hours will suffice.

Although higher or lower temperatures and longer or shorter times than those suggested above may be used, no practical advantage will thereby be achieved.

We have found it advantageous to carry out slow stirring during the extraction, and this may be achieved by any suitable mechanical means.

The tea leaves extract obtained as described above may be used in the other aspect of the invention, where tea leaves extracts are used with at least one polyhydroxy compound and at least one organic acid as a preservative solution. Alternatively, the tea leaves extract used in this aspect may have been obtained by a conventional process. Examples of polyhydroxy compounds and organic acids are as given above in relation to the extracting solution.

The concentrations of the various components of the preservative solution will vary depending upon the method of application of the solution to the foodstuff, e.g. fish, to be preserved. Hence, it is necessary first to consider the method of applying the preservative solution to the foodstuff.

In the application of the preservative agent of this invention to food products, keeping the food products in touch with the preservative agent attains the desired purpose easily with success. There are many methods available for adding the preservative solution to fishery and other foodstuff products. For example, it may be added to raw fish meat paste by mixing, fish meat or split fish may be dipped into the solution, or fishery products, for example, whole or essentially whole fish, fish meat or raw fish meat paste, may be treated by spraying them directly with the preservative solution. Alternatively, the liquid or powdery preservative agent may simply be mixed with the foodstuff to be preserved, and there are no restrictions on the use of these methods.

When the preservative solution is to be applied by dipping, we prefer that the quantity of tea leaves extracts in the preservative solution should be at least 5 mg/100 g of foodstuff to be treated, and more preferably at least 10 mg/100 g and still more preferably at least 40 mg/100 g; the concentration of extract in the preservative solution should be so chosen as to achieve such a level, and will, of course, depend on how long the foodstuff is to remain in the solution. In general, we prefer that the concentration should be at least 0.005% by weight, more preferably at least 0.01% by weight, and most preferably at least 0.04% by weight. The maximum concentration is far less important and will be dictated primarily by considerations of convenience and ease of use. When dipping, it is preferred that the treated fishery products should be dipped for 20 seconds or more, preferably for 5 minutes or more.

When the preservative solution is sprayed on fishery products, a high concentration of tea leaves extracts in the preservative solution is desirable, and thus the tea leaves extracts content is preferably more than 200 mg/100 g.

Polyhydroxy compounds are added in order to raise the osmotic pressure of the preservative solution, and this raised osmotic pressure serves to prevent the propagation of microorganisms and to preserve the fishery products more effectively. The quantity of the polyhydroxy compound added is preferably more than 12 mole per 1 kg of water. Organic acids are added in order to increase the antioxidant effect as synergists by inactivating metals (chelation effect) and in order to prevent coloring happening between tea leaves extracts and ferriferous compounds in fishery products and water and in order to stabilize the components of the tea leaves extracts by decreasing the pH. The amount added is desirably from 2 to 40 mg/100 g for fishery products or the preservative solution for dipping.

The present invention may be applied to the preservation of a variety of foodstuffs, but generally is most suitable for the preservation of seafood products, including the meat and other products derived from fish and sea-dwelling crustaceans, such as crabs, shrimps and the like. More specific examples of food products which may be preserved by the preservative solution of the present invention are: salted and dried fish products made of horse mackerel, mackerel, saury, sardine, yellowtail, salmon and herring as well as the fresh fish and portions thereof; cooked and dried fish products, salted fish products and smoked fish products made from the above fishes; salt-preserved products made of salted salmon, salted trout, salted mackerel, salted herring roe and the like; fish and meat preserved in various types of seasoning [such as sake lees, soy sauce or bean paste (miso)] and which may be made of horse mackerel, mackerel, sea bream, bonito, tuna, beef, pork and chicken; fish paste products, such as chikuwa (tube-shaped fish paste), kamaboko (floated-type boiled fish paste), and fish cakes; dried squid; salted salmon roe; a paste formed of sea urchin eggs; dainty products made of squid, octopus, shellfish, lobster, cod and meat; and other prepared foods, such as ham and sausage.

The preservative agent of the present invention can be used for maintaining the quality of natural food colors, such as β-carotene, paprika and riboflavin; and also for maintaining the quality of food additive vitamins, such as vitamin A, B, C and E.

The invention is further illustrated with reference to the following Examples. The preparation of a tea leaves extract using methanol as the extractant is shown in the Preparation. In the Examples, all parts are by weight, except where otherwise noted.

PREPARATION

Preparation of a tea leaves extract.

90 liters of methanol were added to 30 kg of waste tea leaves, which were obtained as a by-product of green tea production, and the mixture of tea leaves and methanol was heated at about 60° C. for about 3 hours. At the end of this time, the mixture was filtered and the residue was washed with 30 liters of methanol. The filtrate and the washings were combined, to give 90 liters of a methanol extract solution.

1.5 kg of soy bean oil and 6.0 kg of water were added to the methanol extracts solution and the components were mixed. The methanol was then removed by evaporation at 60° C. on a water bath and at 10° C. provided by cooling water under a pressure of 80 mmHg (10664 Pa). Two layers comprising 5.0 kg of an oil layer and 10.5 kg of an aqueous layer were thereby obtained. After separation, the aqueous layer was concentrated by evaporation to attain about an 80% concentration of non-volatile solids at a bath temperature of 70° C. and at 10° C. provided by cooling water under 20 mmHg (2646 Pa), and then this concentrated solution was transferred to another container and was dried at 60° C. under a vacuum of 0.5 mmHg (67 Pa) for 18 hours. The solid formed was ground to powder, and 4.5 kg of a tea leaves extracts powder was obtained.

This tea leaves extracts powder contained 47% by weight of catechin and 8% by weight of caffeine.

EXAMPLE 1

Frozen Japanese horse mackerel was defrosted, it was then eviscerated and the eviscerated surface was washed with water. Subsequently, it was dipped into a 17% w/v aqueous solution of salt for about 30 minutes, and once again was washed with water.

Meanwhile, an aqueous solution was prepared by mixing 10 parts of tea leaves extracts (prepared as described in the Preparation), 28 parts of water, 60 parts of glycerol and 2 parts of citric acid and dissolving 1 part of this mixture in 100 parts of water. The eviscerated Japanese horse mackerel was next dipped into the aqueous solution for 5 minutes, and then the fish was allowed to drip for 5 minutes. It was then dried for 90 minutes in a drier heated by a fuel oil burner. Each piece of this salted and dried Japanese horse mackerel was placed on a tray made of foamed polystyrene and was covered with polyethylene film. It was then kept in a refrigerator at 2°–5° C. during which period each sample was examined to determine organoleptic qualities, the fish meat color was measured with a colorimeter and the peroxide value of the fat was determined; each of these was determined periodically to see how they changed with time.

The salted and dried Japanese horse mackerel treated as described above maintained an outward appearance similar to that just after preparation, namely its taste, flavor and color did not charge for 12 days after preparation, in contrast with an untreated control sample, and the growth of mold was delayed by 1–2 days as compared with the control. In contrast, in the untreated group (control group) an unpleasant odor of oxygenated material was detected on the eighth day after preparation, the yellow color of the fish meat increased, and its taste deteriorated.

Next, the change in color of a small piece of fish meat was measured by the colorimeter with the passage of time, and the change in color is shown in the following Table 1.

TABLE 1

|  | Brightness | | Red color | | Yellow color | |
| --- | --- | --- | --- | --- | --- | --- |
|  | just after prepn. | on 7th day | just after prepn. | on 7th day | just after prepn. | on 7th day |
| Treated group | 28.5 | 28.4 | 8.7 | 5.6 | 7.9 | 5.6 |
| Untreated group | 31.5 | 32.7 | 7.5 | 3.4 | 7.7 | 7.0 |

Next, the fat components of the salted and dried Japanese horse mackerel (extracted with diethyl ether) was sampled to determine the variation of peroxide value in the course of time. The resulting data are presented in the following Table 2.

TABLE 2

|  | Peroxide value (meq/Kg) | | |
| --- | --- | --- | --- |
|  | First day | Fourth day | Eighth day |
| Treated group | 1.0 | 6.7 | 20.0 |
| Untreated group | 5.2 | 18.5 | 56.9 |

EXAMPLE 2

One part of the tea leaves extracts mixture prepared as described in Example 1. 4 parts of salt and 95 parts of water were mixed, and 20 kg of the resulting aqueous solution was boiled. 1 kg of Japanese anchovy was thrown into the boiled solution, and then boiled for about a further 5 minutes. The fishes were then removed from the solution and, after cutting and draining, the fishes were then dried to attain a water content of 15% in a hot air drier with an electric heater, and thus ccoked and dried small sardines were prepared.

These cooked and dried small sardines were packed in a polyethylene bag and were preserved at room temperature, and organoleptic properties and the peroxide value of the fat were examined and measured to determine the variation in the course of time. Consequently, in the treated cooked and dried small sardines yellowing of the abdomen appeared slightly and the fishy odor thereof was also slight as compared with untreated controls on the 10th day after preparation. The peroxide value just after preparation of the treated group was 50 meq/Kg and that of the untreated group was 100 meq/Kg. It is clear that the peroxide value of the treated group was low as compared with that of the untreated group.

EXAMPLE 3

Fish meat from live mackerel was dipped in an aqueous solution, which comprised one part of the tea leaves extracts mixture prepared as described in Example 1 and 99 parts of water, for 5 minutes, and then the fish meat was allowed to drain for 5 minutes. At the end of this time, the fish meat treated as described above was placed on a foamed polystyrene tray and covered with polyethylene film. It was then kept in a refrigerator at 2°-5° C. and the variation of organoleptic properties and fish meat color measurement by colorimeter was determined in course of time. The untreated group became discolored on the first day of refrigeration, but the live mackerel fish meat treated as this Example maintained a sufficient red meat color on the fourth day of refrigeration and presented no deterioration of freshness in appearance. Moreover, the cooked taste thereof was excellent.

EXAMPLE 4

Fish meat from live yellowtail was dipped in an aqueous solution, which comprised two parts of the tea leaves extracts mixture prepared as described in Example 1 and 98 parts of water, for 10 minutes, and it was then allowed to drain for 5 minutes. The treated fish meat of live yellowtail was placed on a foamed polystyrene tray and covered with polyethylene film. It was then kept in a refrigerator at 2°-5° C., and the variation of organoleptic properties and fish meat color measurement by colorimeter were determined in course of time. The untreated fish meat of live yellowtail showed discoloration of the red meat on the first day of refrigeration, and yellowing of the side abdomen appeared on the third day of refrigeration. In contrast, the treated fish meat of live yellowtail maintained sufficient red meat color on the fourth day of refrigeration and yellowing of the side abdomen appeared only slightly. The taste of the treated fish meat was excellent after cooking.

EXAMPLE 5

Five kg of an aqueous solution comprising 0.1 kg of citric acid, 4.25 kg of glycerol and 0.65 kg of water was added to 1 kg of powdery green tea in a vessel, and the vessel was placed on a boiling water bath. Extraction was continued with intermittent stirring for 1 hour. At the end of this time, the resulting solution was centrifuged at 3,000 rpm by centrifugal equipment with a 300 mesh (Tyler standard) screen of stainless steel. 4 kg of a brown, semi-transparent and viscous solution containing extracts was obtained. In the extracts solution, the contents of active components were 1.24% by weight of (—)epi-gallocatechin gallate and 0.27% by weight of (—)epi-catechin gallate. However, about 1 kg of extracting solution remained in the extracts residue, and consequently the yield of active components per unit weight of tea leaves is about 7.5%. A chart of the liquid chromatography of the extracts solution is presented in FIG. 1.

Conditions and results of liquid chromatography analysis are as follows:

| Conditions of analysis: | |
| --- | --- |
| Column: | ODS 5 μm 4.6φ × 250 mm |
| Mobile phase: | 20% aqueous acetonitrile solution (v/v) |
| Flow rate: | 0.6 ml/min |
| Detector: | UV 275 nm (0.16 ABU) |
| Cahrt speed: | 5 mm/min |
| Injection: | 8 μl |
| Peak No. | |
| (1): | (—)epi-gallocatechin gallate |
| (2): | caffeine |
| (3): | (—)epi-catechin gallate |

EXAMPLE 6

Ten kg of an aqueous solution comprising 0.2 kg of citric acid, 3 kg of glucose, 3.8 kg of water, and 3 kg of glycerol, was added to 1 kg of powdery green tea, and then the mixture was treated as described in Example 1, to yield about 9 kg of an extracts solution.

Figure 2:
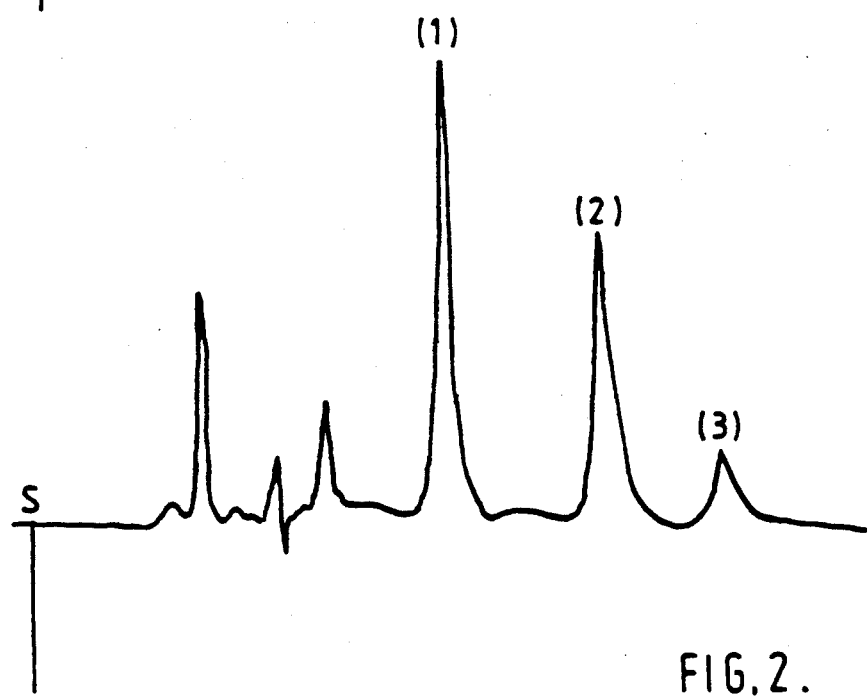
FIG. 2 shows a chart of the liquid chromatography of the extracts solution of Example 6.
Figure 3:
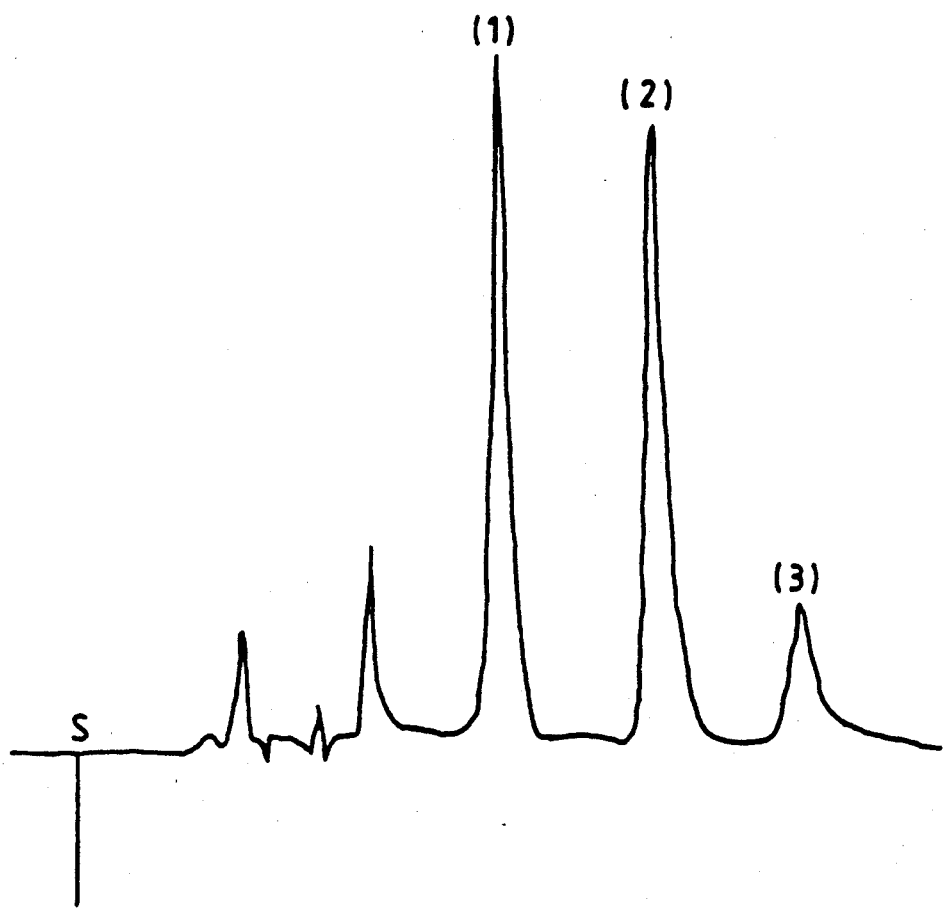
FIG. 3 shows a chart of the liquid chromatography of an extracts solution prepared using methanol as the extractant.

In the extracts solution, contents of active components were 0.59% by weight of (—)epi-gallocatechin gallate and 0.14% by weight of (—)epi-catechin gallate. When calculated as described in Example 1, the yield of active components per unit weight of tea leaves was about 7.3%. A chart of the liquid chromatography of the extracts solution is presented in FIG. 2. As a reference, methanol solution, which was obtained by extracting of tea leaves with methanol and decolorized with active carbon, was analyzed by liquid chromatography. Its chart is presented in FIG. 3.

EXAMPLE 7

Frozen Japanese horse mackerel (*Trachurus japonicus* Temminck et Schlegel) was defrosted with running water. It was then eviscerated and the eviscerated surface was washed with water. Subsequently, it was dipped in a 17% w/v aqueous solution of salt for about 30 minutes, and once again it was washed with water. This eviscerated Japanese horse mackerel was dipped for 5 minutes in an aqueous solution, which contained 1% of an extracts solution obtained by the procedure described in Example 5, and it was then allowed to drain for 5 minutes, and finally dried for 90 minutes in a drier heated by a fuel oil burner.

Each piece of the salted and dried Japanese horse mackerel was separately placed on a tray made of foamed polystyrene and was covered with polyethylene film. It was then kept in a refrigerator at 2°-5° C., during which period each sample was examined for organoleptic properties, changing of fish meat color by colorimeter, and peroxide value of fat and the variations thereof in course of time. The salted and dried Japanese horse mackerel treated with the extracts solution obtained by the procedure of Example 5 maintained an outward appearance similar to that just after preparation; its taste, flavor and color were maintained sufficiently fresh for 12 days after the processing date; and mold growth was 1-2 days slow as compared with an untreated control group. As compared with this, in the untreated group (control group) an unpleasant odor of oxygenated material was easily detected on the seventh day after the processing date, and the red color of the fish meat faded and so became relatively yellowish; moreover, its taste deteriorated.

Table 3 shows the variation of color of a small piece of fish meat with time, as measured by colorimeter.

TABLE 3

| | Brightness | | Red color | | Yellow color | |
| --- | --- | --- | --- | --- | --- | --- |
| | just after prepn. | on 7th day | just after prepn. | on 7th day | just after prepn. | on 7th day |
| Treated group | 33.6 | 33.8 | 6.7 | 4.9 | 5.9 | 4.3 |
| Untreated | 33.3 | 37.6 | 5.8 | 1.3 | 5.1 | 5.2 |

TABLE 3-continued

| | Brightness | | Red color | | Yellow color | |
| --- | --- | --- | --- | --- | --- | --- |
| group | just after prepn. | on 7th day | just after prepn. | on 7th day | just after prepn. | on 7th day |

Table 4 presents the variation with time of the peroxide value of fat of the salted and dried Japanese horse mackerel extracted with diethyl ether.

TABLE 4

| | Peroxide value (meq/Kg) | | |
| --- | --- | --- | --- |
| | First day | Fourth day | Eighth day |
| Treated group | 2.0 | 8.3 | 21.0 |
| Untreated group | 5.5 | 19.6 | 55.8 |

We claim:

1. A method of producing an extract of tea leaves, comprising extracting tea leaves with an extracting solution which is an acidic medium containing at least one food grade polyhydroxy compound, at least one food grade organic acid and water.

2. A method as claimed in claim 1, wherein the polyhydroxy compound is selected from the group consisting of alkane polyols, sugar alcohols, sugars, food grade hydroxy polymers, hydrolysates of starch and hydrogenated analogs thereof.

3. A method as claimed in claim 1, wherein the polyhydroxy compound is selected from the group consisting of 1,2-propylene glycol, glycerol, xylitol, sorbitol, maltitol, xylose, glucose, fructose, sucrose, maltose, lactose, polyvinyl alcohol, a hydrolysate of starch and a hydrogenated analog thereof.

4. A method as claimed in claim 1, wherein the polyhydroxy compound is selected from the group consisting of 1,2-propylene glycol and glycerol and mixtures thereof.

5. A method as claimed in claim 1, wherein the organic acid is selected from the group consisting of citric acid, tartaric acid, phytic acid, ascorbic acid and gallic acid.

6. A method as claimed in claim 1, wherein the organic acid is citric acid.

7. A method as claimed in claim 1, wherein the polyhydroxy compound is selected from the group consisting of 1,2-propylene glycol and glycerol and mixtures thereof and the organic acid is citric acid.

8. A food preservative solution comprising an extract of tea leaves, at least one food grade polyhydroxy compound, at least one food grade organic acid and water, and wherein the concentration of said polyhydroxy compound in the aqueous medium is from about 50% to about 90% by weight.

9. A solution as claimed in claim 8, wherein the polyhydroxy compound is selected from the group consisting of alkane polyols, sugar alcohols, sugars, food grade hydroxy polymers, hydrolysates of starch and hydrogenated analogs thereof.

10. A solution as claimed in claim 8, wherein the polyhydroxy compound is selected from the group consisting of 1,2-propylene glycol, glycerol, xylitol, sorbitol, maltitol, xylose, glucose, fructose, sucrose, maltose, lactose, polyvinyl alcohol, a hydrolysate of starch and a hydrogenated analog thereof.

11. A solution as claimed in claim 8, wherein the polyhydroxy compound is selected from the group consisting of 1,2-propylene glycol and glycerol and mixtures thereof.

12. A solution as claimed in claim 8, wherein the organic acid is selected from the group consisting of citric acid, tartaric acid, phytic acid, ascorbic acid and gallic acid.

13. A solution as claimed in claim 8, wherein the organic acid is citric acid.

14. A solution as claimed in claim 8, wherein the polyhydroxy compound is selected from the group consisting of 1,2-propylene glycol and glycerol and mixtures thereof and the organic acid is citric acid.

15. A solution as claimed in claim 8, wherein the concentration of said organic acid in the aqueous medium is from about 0.5% to about 5% by weight.

16. A solution as claimed in claim 8, wherein the concentration of said organic acid in the aqueous medium is from about 1% to about 3% by weight.

17. A food preservative solution comprising an extract of tea leaves, at least one food grade polyhydroxy compound, at least one food grade organic acid and water wherein the concentration of said polyhydroxy compound is from about 70% to about 90% by weight.

18. A food preservative solution comprising an extract of tea leaves, at least one food grade polyhydroxy compound, at least one food grade organic acid and water, wherein said extract is prepared by using an extracting solution which is an acidic medium containing at least one food grade polyhydroxy compound, at least one food grade organic acid and water; and the concentration of said polyhydroxy compound in the aqueous medium is from about 70% to about 90% by weight.

19. A food preservative solution comprising: from 50 to 90% by weight of a food grade polyhydroxy compound selected from the group consisting of 1,2-propylene glycol and glycerol; from 1 to 3% by weight of citric acid; a tea leaves extract; and water.

20. A solution as claimed in claim 19, wherein said extract is prepared by using an extracting solution which is an acidic medium containing at least one food grade polyhydroxy compound, at least one food grade organic acid and water.

21. A preserved sea food product as claimed in claim 19, wherein said extract is prepared by using an extracting solution which is an acidic medium containing at least one food grade polyhydroxy compound, at least one food grade organic acid and water.

22. A preserved sea food product wherein there is incorporated a preserving agent comprising an extract of tea leaves, at least one food grade polyhydroxy compound, at least one food grade organic acid and water.

23. A preserved sea food product as claimed in claim 22, wherein said extract is prepared by using an extracting solution which is an acidic medium containing at least one food grade polyhydroxy compound, at least one food grade organic acid and water.

24. A preserved sea food product as claimed in claim 23, wherein the polyhydroxy compound is selected from the group consisting of 1,2-propylene glycol and glycerol and mixtures thereof and the organic acid is citric acid.

25. A preserved sea food product as claimed in claim 23, wherein the concentration of said polyhydroxy compound in the aqueous medium is from about 70% to about 90% by weight.

26. A preserved sea food product as claimed in claim 22, wherein the polyhydroxy compound is selected from the group consisting of alkane polyols, sugar alcohols, sugars, food grade hydroxy polymers, hydrolysates of starch and hydrogenated analogs thereof.

27. A preserved sea food product as claimed in claim 22, wherein the polyhydroxy compound is selected from the group consisting of 1,2-propylene glycol, glycerol, xylitol, sorbitol, maltitol, xylose, glucose, fructose, sucrose, maltose, lactose, polyvinyl alcohol, a hydrolysate of starch and a hydrogenated analog thereof.

28. A preserved sea food product as claimed in claim 22, wherein the polyhydroxy compound is selected from the group consisting of 1,2-propylene glycol and glycerol and mixtures thereof.

29. A preserved sea food product as claimed in claim 22, wherein the organic acid is selected from the group consisting of citric acid, tartaric acid, phytic acid ascorbic acid and gallic acid.

30. A preserved sea food product as claimed in claim 22, wherein the organic acid is citric acid.

31. A preserved sea food product as claimed in claim 22, wherein the polyhydroxy compound is selected from the group consisting of 1,2-propylene glycol and glycerol and mixtures thereof and the organic acid is citric acid.

32. A preserved sea food product as claimed in claim 22, wherein the concentration of said polyhydroxy compound in the aqueous medium is from about 50% to about 90% by weight.

33. A preserved sea food product as claimed in claim 22, wherein the concentration of said polyhydroxy compound in the aqueous medium is from about 70% to about 90% by weight.

34. A preserved sea food product as claimed in claim 22, wherein the concentration of said organic acid in the aqueous medium is from about 0.5% to about 5% by weight.

35. A preserved sea food product as claimed in claim 22, wherein the concentration of said organic acid in the aqueous medium is from about 1% to about 3% by weight.

36. A preserved sea food product as claimed in claim 22, comprising: from 50 to 90% by weight of a polyhydroxy compound selected from the group consisting of 1,2-propylene glycol and glycerol; from 1 to 3% by weight of citric acid; a tea leaves extract; and water.

* * * * *